United States Patent [19]
Duron et al.

[11] 3,733,848
[45] May 22, 1973

[54] FREEZING SYSTEM

[75] Inventors: Paul P. Duron, Orange; Thomas A. Carter, Jr., Whittier; Frank Mondok, Glendora, all of Calif.

[73] Assignee: Airco, Inc., New York, N.Y.

[22] Filed: Aug. 9, 1971

[21] Appl. No.: 170,175

[52] U.S. Cl. .................................. 62/381, 99/197
[51] Int. Cl. ............................................. F25d 25/02
[58] Field of Search .................. 62/63, 64, 380, 381; 99/197, 198

[56] References Cited

UNITED STATES PATENTS

| | | | |
|---|---|---|---|
| 3,269,142 | 8/1966 | Demola et al. | 62/381 X |
| 3,299,659 | 1/1967 | Dreksler et al. | 62/380 X |
| 3,316,726 | 5/1967 | Pauliukonis | 62/514 X |
| 3,464,229 | 9/1969 | Riley | 62/381 |

OTHER PUBLICATIONS

K. A. Merz, "Transverse-Flow Fans", Product Engineering April 1, 1963 pps. 51–55

Primary Examiner—William F. O'Dea
Assistant Examiner—Ronald C. Capossela
Attorney—H. Hume Mathews and Edmund W. Bopp

[57] ABSTRACT

A high rate freezing system comprising an insulating housing wherein expansion of liquid carbon dioxide ($CO_2$) maintains a freezing atmosphere. A belt conveyor with multiple flights defining a vertical helix passes food products through the housing. A plurality of line-flow blowers with vertical axes of rotation at spaced positions around the helix direct wide streams of cold $CO_2$ gas respectively, generally tangentially across all the conveyor flights for causing swirling movement of the gas throughout the helix.

9 Claims, 4 Drawing Figures

INVENTORS
PAUL P. DURON
THOMAS A. CARTER, JR.
BY FRANK MONDOK

ATTORNEY

Patented May 22, 1973

INVENTORS
PAUL P. DURON
THOMAS A. CARTER, JR.
BY FRANK MONDOK

ATTORNEY

FREEZING SYSTEM

BACKGROUND OF THE INVENTION

Systems for fast freezing of food products, such as fruits, vegetables, meats, etc., have been extensively used in the food industry for many years for storing for economical year around use seasonal foods and those whose production is subject to variables of economic conditions.

In addition to storage, an important commercial consideration requires that the natural flavor, juices, nutrients, color and appearance of the foods be preserved to the extent practically possible.

The prior art systems available for this general purpose have significant disadvantages that the present invention aims to overcome. For example, in the well-known cold air-blast system, the freezing process is not sufficiently fast for avoiding some dehydration, with corresponding decrease in quality of the frozen products. In another known system wherein efficient freezing takes place within a liquid nitrogen tunnel, the operation is generally more expensive due to the cost of the product and the storage and transfer piping required to handle it; also, production time may be lost while waiting for cool-down of the tunnel.

The present invention accordingly is concerned with a highly efficient, fast freezing system that is economical both in equipment cost, operating costs and system maintenance costs.

SUMMARY OF THE INVENTION

In accordance with the invention, fast, efficient, and economical food freezing is achieved in a new and improved system wherein the principal features of several component systems, namely a multiple-flight conveyor system in tier-like form, a line-flow (or transverse wide-band flow) type of blower system, and a liquid $CO_2$ expansion system are advantageously combined within an insulating housing for optimum freezing rate. In particular, the food products to be frozen are carried into the housing at the lower tier (or flight) level of a helical conveyor and are discharged in frozen condition at the upper flight level. During the helical ascent, the products are subjected at all flight levels to a continuous swirling and enveloping stream of cold $CO_2$ gas constituting the freezing atmosphere of the housing. This is efficiently and economically accomplished by two or more line-flow blowers with vertical axes spaced around the outer periphery of the helix. Liquid $CO_2$ is expanded into the discharge path of the blowers. The respective directions of the vertically-wide blower exhaust streams are generally tangential to and transversely of peripheral loops of the helix so that the conveyor at substantially all flight levels thereof is encompassed by rapidly moving cold $CO_2$ gas. The directional forces of the streams are cumulative for producing continuous swirling, such as clock-wise rotation for example, of the freezing gas within and around the helix. As each food product during the entire conveyor passage is continuously subjected to optimum conditions for high rate of heat transfer to the freezing medium, exceptionally fast freezing is achieved with resulting high degree of retention of food flavor, juices, etc., not previously accomplished in equipment of the type in question.

A principal object of the invention therefore is to provide a new and improved continuous process, food freezing system using comparatively inexpensive, commercially available liquid $CO_2$ for freezing purposes, that has exceptionally fast freezing capability for obtaining improved quality of the frozen product, is economical to operate and maintain, and wherein loss of production time is minimal.

Another and related object is to provide an improved high rate freezing unit of the character above, having a compact multiple-tier type food conveyor, wherein a vertical-axis, line-flow blower system is used in combination with a liquid $CO_2$ spray system for simultaneously subjecting all flights of the conveyor and the food products thereon to continuous transverse freezing streams of $CO_2$ gas.

DESCRIPTION OF PREFERRED EMBODIMENT

Figure 1:
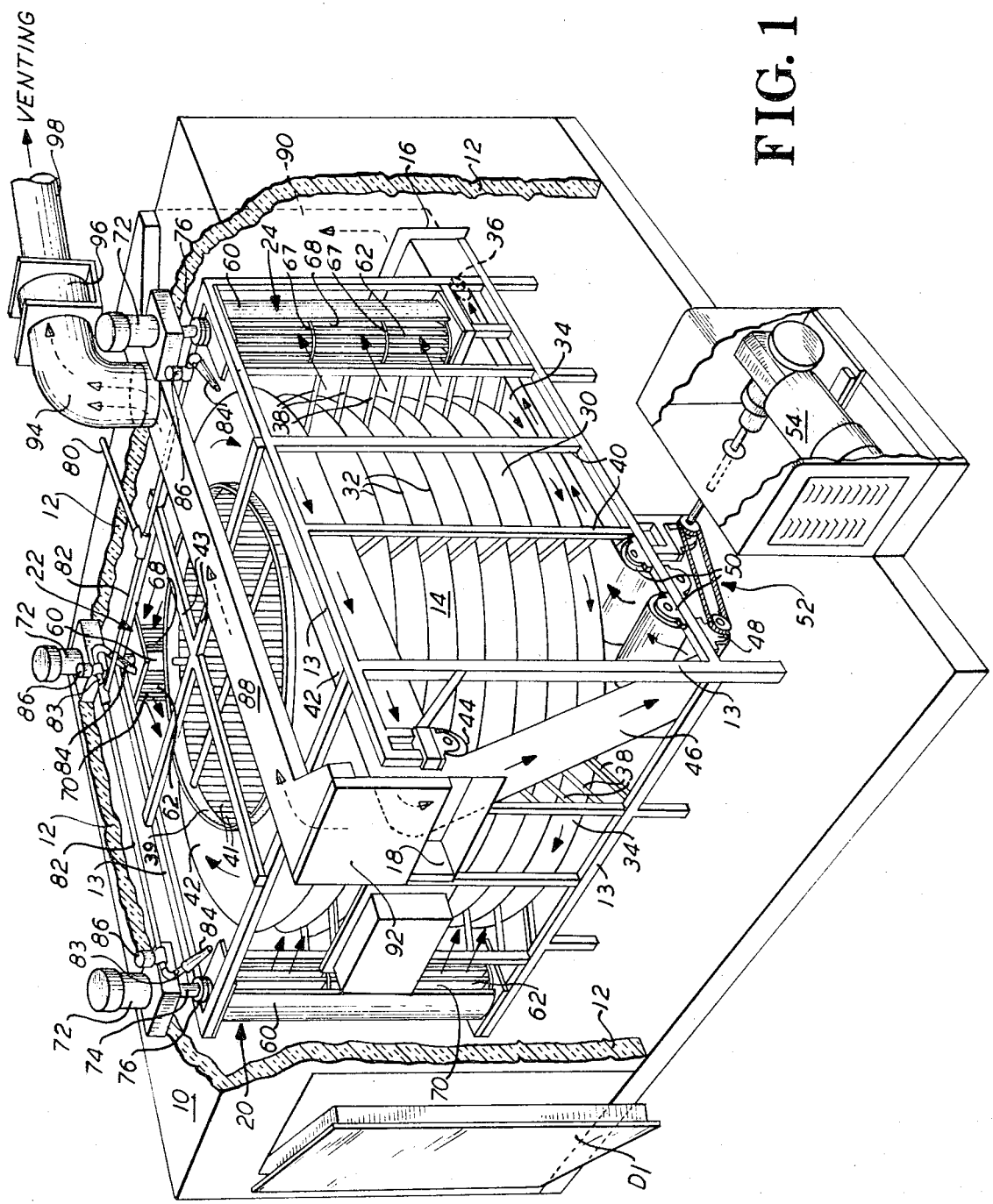
FIG. 1 is a perspective view of a high rate freezing unit, partly broken away, embodying the present invention.
Figure 2:
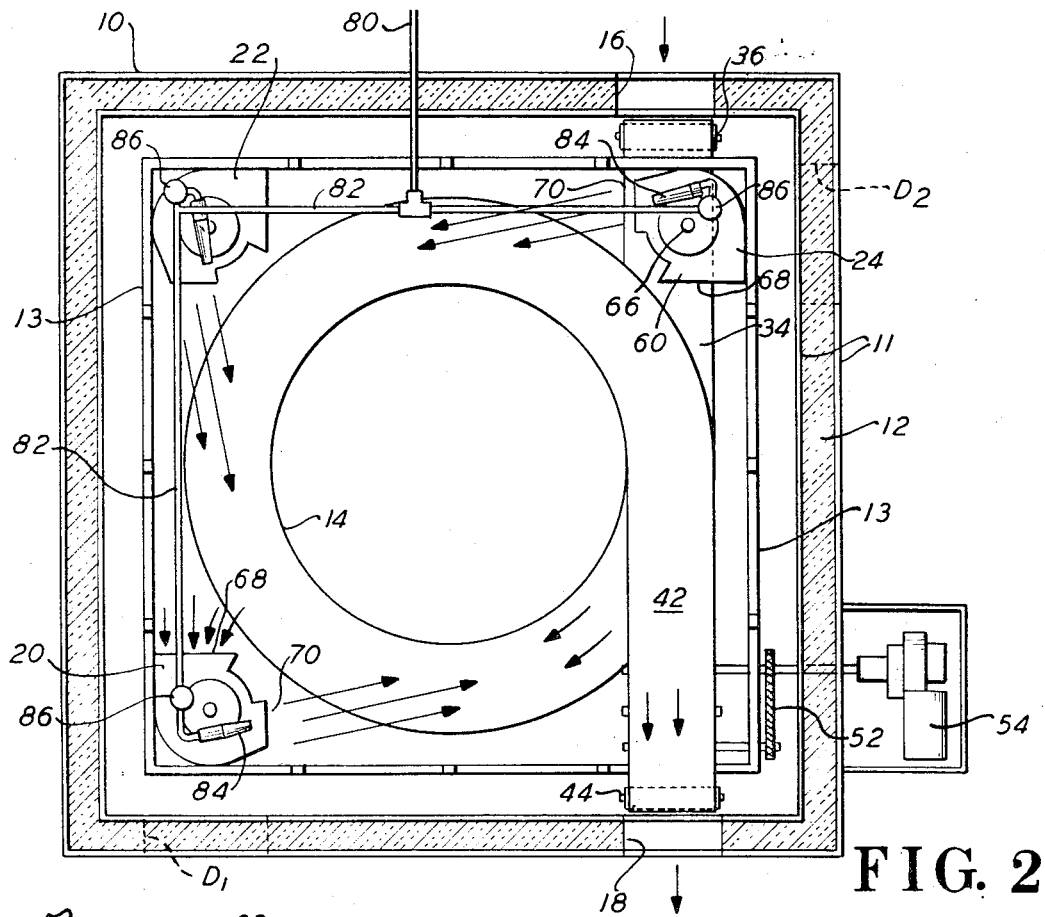
FIG. 2 is a top plan schematic view of the unit, with cover removed, showing in part essential elements of the freezing system and the operative arrangement thereof.
Figure 3:
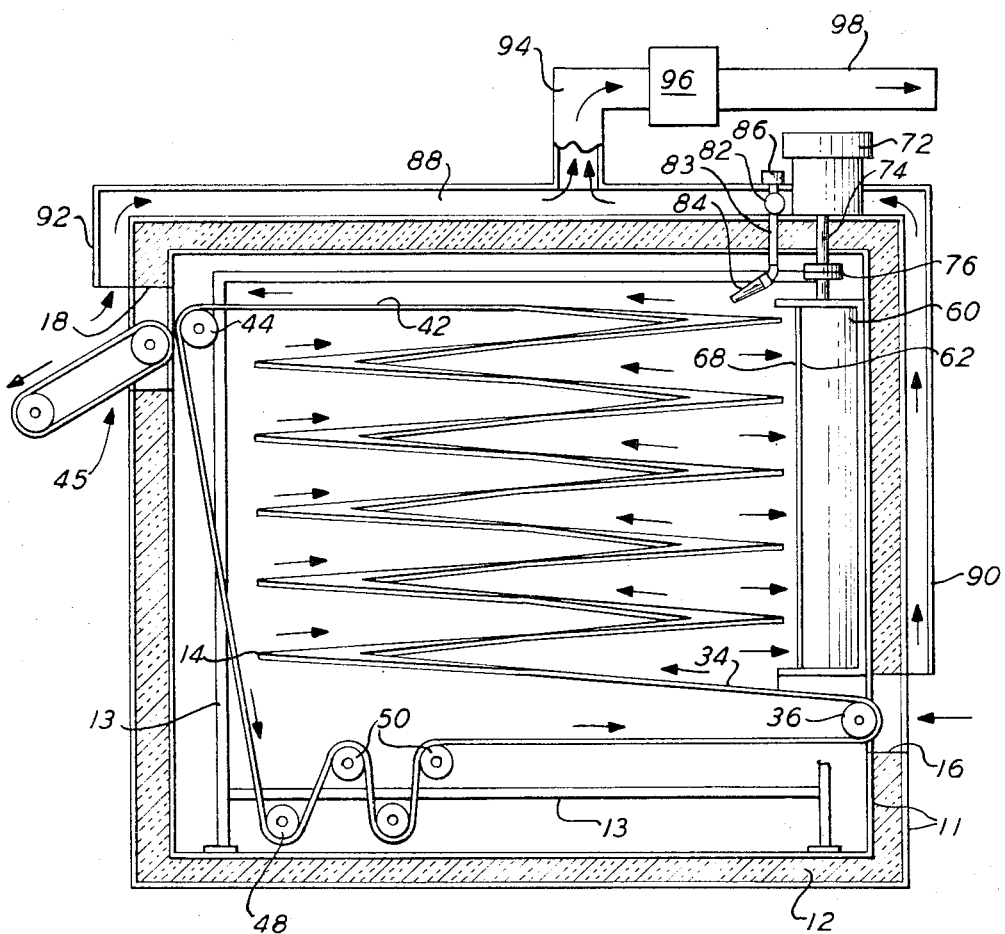
FIG. 3 is a partly schematic view of the unit in side elevation.

The fast freezing system unit shown in FIG. 1, 2 and 3 comprises an enclosing box-like insulating housing 10, the walls of which may constitute spaced sheets 11 of stainless steel, for example, with interposed conventional foam type insulation 12, such as closed cell polyurethane insulation, FIG. 2. A supporting frame 13 for system equipment is mounted centrally on the floor of the housing, FIG. 1, and is spaced from the walls thereof to provide adequate personnel access space as indicated for inspection, clean-up and maintenance. Housing access and interior release doors $D_1$ and $D_2$ are provided as generally indicated in FIG. 1 and 2. The access space in FIG. 2 and 3 has been reduced in size for purpose of illustration.

Within the frame 13 is suitably mounted a multiple-tier type conveyor such as a belt conveyor 14 defining a vertical helix, that provides continuous conveyor passage from its lower flight level to its upper flight level, or vice versa, as desired. In this example, food to be frozen is fed to the lower flight of the conveyor through an entry port 16 in the housing wall and is discharged at the upper flight through an outlet port 18, preferably at the opposite side.

There are also mounted in the frame 13 at spaced points around the periphery of the conveyor (conveniently in the corners of the frame) at least two line-flow blowers. In the present example, three blowers 20, 22 and 24 are shown in respective corners of the frame. The rotation axis of each blower is vertically positioned so that the plane of rotation of all blowers is horizontal; the blower exhaust is arranged and oriented so that the discharge path is directed generally tangentially of and across adjacent flights of the conveyor as best shown in FIG. 2. Line-flow blowers or fans (sometimes referred to as transverse-flow fans) are similar in overall appearance to centrifugal fans. In a centrifugal fan the air is drawn in axially and it is discharged radially. The line-flow blower draws air in radially through one section and discharges it radially outward through another section of the blower periphery. Thus line-flow blowers have a characteristic wide band discharge which spans the width of the rotor.

In accordance with one aspect of the invention, the vertical dimension of preferably all blower rotors corresponds approximately to the total flight height of the conveyor, so that the characteristic wide-band discharge stream of the line-flow type blower substantially spans, i.e., vertically covers, all the flights. Thus, all levels of the conveyor are simultaneously subjected to a continuous transverse stream from each blower. As clearly indicated in FIG. 2, the directional forces of the tangential streams are serially related and cumulative, so that a strong swirling movement is set up by combined action of the blowers around and within the periphery of the helix and especially across the advancing and relatively contra-moving (short arrows on belt) food-bearing surfaces of all the conveyor flights. Turbulence set up by the cold swirling $CO_2$ gas extends within the helix as generally indicated in FIG. 2, so that the food at all levels of the conveyor is encompassed and traversed by refrigerating streams of $CO_2$.

The conveyor 14 preferably comprises a continuous stainless steel mesh belt 30 forming flights or tiers such as 32 that start from the lower level at the entry port 16 and ascend along a continuous path to the upper level opposite the discharge port 18. The mesh belt per se can be of the character disclosed, for example, in U. S. Pat. No. 2,872,023 granted on Feb. 3, 1959, wherein the so-called "flat-wire" construction provides for movement of the conveyor belt along a path that is curved transversely in the plane of travel of the belt. The belt is preferably of openwork construction whereby both sides of the food product may be contacted with the circulating cold gas.

Preferably the conveyor belt defines a compact vertical helix as shown in FIG. 1, wherein the lower flight 34, starting from the guide roll 36 at the entry port, continues in gradual ascent along a generally flat, vertically pitched path around the loops of the helix. The steel mesh belt is suitably supported and guided at spaced intervals along the helix by conventional means; for simplicity of disclosure, the belt is herein shown as movable over horizontal rails 38 mounted in cantilever manner on outer vertical uprights 40 of the frame 13.

Other supporting and guiding means can obviously be used such as, for example, helically curved guides located under the belt and supported by uprights 40. The inner edges of the belt make contact with and are guided by a central cylindrical type cage or drum 39 having a vertical axis of rotation that is coincident with the longitudinal axis of the helix. As shown herein, the drum periphery is formed by spaced vertical driving bars 41 that frictionally engage the inner belt edges. The drum itself is supported on the frame 13 by a central drive shaft and end bearings (not shown) that can be mounted on cross-frame members, such as the top members 43.

The upper flight belt section 42 after passing over the guide roll 44 at the discharge port 18 (for discharging the frozen products onto an auxiliary ramp conveyor 45, or the like, FIG. 3) goes downward (at 46) to a drive roll 48 mounted on the lower part of the support frame, from which it passes as indicated by direction arrows, over and between guide and tensioning rolls 50 on the return path to the entry port guide roll 36 and start of the lower flight 34. The drive roll 48 in the present instance preferably is provided with suitable tension control according to known practice, and is connected in suitable manner as through a chain-gear transmission indicated at 52 to a variable speed conveyor drive gear-motor 54. Conventional motor control is used for adjusting the conveyor speed to freezing requirements of the system.

Various systems for driving the conveyor system shown in FIG. 1 may be used. One such system is disclosed in U.S. Pat. No. 3,348,659, issued on Oct. 24, 1967. The system disclosed in the patent drives the drum at a speed in excess of the belt speed to maintain the proper conformation of the belt. Thus a power take-off from the output shaft of the drive motor 54 can be connected to drive the drum 39 at a desired speed relative to the conveyor belt speed. In that the details of this drive system form no part of the present invention, they are not illustrated in any detail in the drawings.

Figure 4:
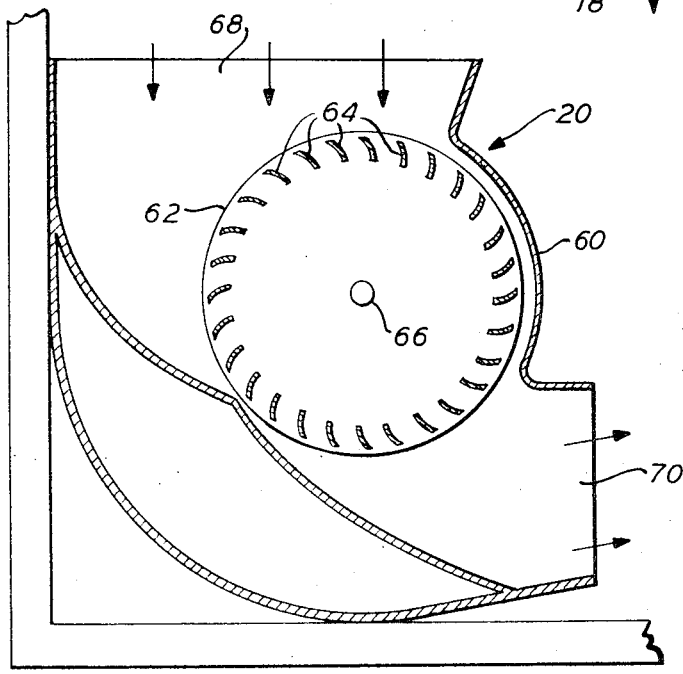
FIG. 4 is a cross-sectional view of the line-flow blower shown in the unit above, taken transversely of the blower axis of rotation.

The helical or open-tier type conveyor described herein is uniquely related to the blower system for simply and directly achieving optimum surface contact between the flight-borne food products and the transverse discharge streams of the blowers. The system line-flow blowers 20, 22 and 24, FIG. 2 and 4, each comprise a housing 60 in which is mounted an elongated rotor 62, FIG. 1 and 3, having peripheral vanes 64 extending parallel to the rotor axis 66 in "squirrel cage" manner. The housing has an inlet opening 68 and a discharge opening 70, both extending substantially throughout the rotor length. Supporting discs 67 are used to strengthen the blowers and prevent the vanes 64 from flying off. Thus a broad stream of gas in band width corresponding to the axial length of the rotor is directed through the blower rotor transversely of its longitudinal axis for discharging from the housing outlet at an angle approximately 90° from the inlet flow. In this type blower, the length of the rotor as well as rotor rpm determine the flow rate of the discharge stream. The blower shown is a typical line-flow blower design and it is recognized that other comparable designs may be used to practice the instant invention.

As generally indicated in FIG. 1, each blower rotor can be driven at its upper end by a motor 72 through a shaft 74 having a flexible coupling generally indicated at 76. The motor may be suitably mounted either on the upper part of the frame 13 within the housing or, as preferred, above the housing as indicated in FIG. 1 and 3 for more ready servicing. The upper and lower ends of the blower rotor shaft may be mounted in suitable bearings (not shown).

The line-flow blower system described above, in combination with means for expanding liquid $CO_2$ into the blower discharge path, provides a stream of freezing medium, namely a cold blast of $CO_2$ gas initially at about −110° F that directly contacts and envelops the food products along all flights of the conveyor. As the conveyor belt is positioned substantially edgewise to the blower broad-band discharge streams, FIG. 2, it will be apparent that flow resistance to passage of the $CO_2$ gas between and across the respective flights of the conveyor is minimized. Accordingly there is ensured a comparatively high rate of flow of the low temperature freezing medium as it contacts the food products and hence a high rate of heat transfer for achieving very fast food freezing.

In the embodiment shown in FIG. 2 the line-flow blowers create a counterclockwise flow of cold $CO_2$ gas which in vertical extent traverses all flights of the conveyor system. The positioning of the line-flow blowers in the corner areas of the housing seems to eliminate or, at least, greatly reduce the possibilities of dead spots in the corners of the chamber. Thus the continuous and massive circulation of $CO_2$ vapor throughout the interior of the chamber provides for a substantially uniform temperature in the chamber and also provides for greatly increased contact between the moving gas and the product. In addition, the circulation in FIG. 2 is countercurrent to the flow of product on the conveyor. This additional relative movement also assists in increasing the cooling rate.

It is pointed out, however, that the belt moves relatively slowly (for example, adjustable from 4–70 fpm) and the invention would also successfully operate with co-current flow since there would still be large relative movement between the gas and product. Such co-current flow would occur in the embodiment of FIG. 1 if port 18 were used as an infeed end and port 16 as the exit end.

The line-flow blowers have been positioned in relation to one another so that they cooperate to maintain a substantially unidirectional flow of gas within the chamber. This flow generally takes place about the rotating cage 39; however, if the cage is of openwork construction, as shown in FIG. 1, a certain amount of gas would flow through the bars 41 and there would also be some turbulent flow within the cage. The cage 39 could also, however, be formed from sheet material and thus form a barrier to flow into the cage. A cage made of solid sheet material would tend to further channel the unidirectional flow in a circumferential direction around the cage.

The utilization of line flow fans in the described vertical position benefits the freezing operation in still another way. The vertical arrangement causes the output from the fans to traverse both the upper and lower sides of the openwork conveyor and thereby accomplish freezing of the product progressively from both the upper and lower surfaces of the product. The spaced conveyor flights forming conduits which channel the gas for rotary movement around the chamber.

The liquid $CO_2$ expansion system may, as in the present example, comprise a simple supply header and valve-controlled spray nozzle arrangement for feeding $CO_2$ vapor into the discharge streams of respective blowers. As best shown in FIG. 2, a supply line 80 from a source of liquid $CO_2$ is connected to a header 82 that extends along the roof of the housing 10. The header may be within the housing or it may be mounted on top of the roof as shown. The liquid $CO_2$ is supplied at the header at about 250–300 psig. A valve controlled pressure spray nozzle 84 is connected to a take-off outlet 83 that may be located somewhat above the corresponding blower discharge, or above the blower itself. In the present example, three nozzles, one for each blower, are located within the housing at positions for directing vaporized $CO_2$ downwardly, for example at an angle of 45°, directly into the approximate center of the blower discharge stream. The expanded $CO_2$ vapor then passes down through the associated blower discharge and is distributed thereby across the adjacent tiers of conveyor.

In each take-off connection between header and spray nozzle suitable control means, such as a solenoid-controlled valve indicated at 86, is provided for regulating the rate of refrigeration feed to the unit. A conventional adjustable temperature control system, responsive to a temperature sensor (not shown) in the housing, can be used for controlling the solenoid valves that control the amount of refrigerant fed to the respective expansion nozzles. The control system includes a precision controller-recorder with adjustable set points for accurate temperature control during operation and standby. The system senses changes in temperature and signals the $CO_2$ solenoid control valves to inject $CO_2$. The temperature sensor is located near the input area to maximize sensitivity to changes. Thus a selected constant temperature such as −80° F can be maintained in the housing irrespective of the product load. In characteristic fashion the liquid $CO_2$ initially forms $CO_2$ snow and vapor upon expansion from storage pressure and temperature (about 300 psig and 0° F) to ambient pressure. The snow, however, quickly vaporizes in the chamber and little if any contacts the product being frozen.

The temperature control system can be set to maintain any desired temperature in the chamber. For example, over weekends the unit can be maintained at 0° F for purposes of conserving $CO_2$ and to insure a quick cool-down on the following work day.

It will be apparent, of course, that where materially increased freezing capacity is required of the unit, the header take-off connections 82 can be extended and additional expansion (spray) nozzles can be added at suitable positions, such as at vertically spaced pints laterally of a blower, for introducing two or more $CO_2$ spray jets into respective blower discharge streams. In some cases it may be advantageous to position the main nozzle at a mid-portion and laterally of the discharge stream for introducing the $CO_2$ vapor generally along the flow direction of the stream.

During continuous operation of the freezing unit, ambient air ordinarily tends to migrate toward the interior of the housing by way of the entry and discharge ports 16 and 18. The entry of such air, with attendant moisture, would reduce the freezing efficiency of the unit and create water ice in the unit. Maintenance of a substantially complete $CO_2$ atmosphere for the unit is important as $CO_2$ inhibits bacterial growth and thus is a natural preservative having the added advantage of greatly extending product shelf-life. Curtain-like baffles may be positioned in the entrance and exit ports to at least partially seal the opening.

In addition, air and moisture migration is simply and economically substantially eliminated by means of a main exhaust duct 88 that extends across the top of the housing and downward at 90 and 92 along opposite sides of the housing to the respective ports 16 and 18. The main exhaust duct 88 is connected to an overhead venting pipe 94 having an induction or exhaust fan indicated at 96 for venting at 98 the exhaust gases to atmosphere, or where the sensible heat of the exhaust is significant to a pre-cooling system wherein the refrigerant capacity of the gases can be used to pre-cool incoming products, etc., as desired. Each lateral extension of the exhaust duct is open-ended and terminates at the upper section area of the corresponding port, FIG. 1 and 3.

Accordingly, the exhaust fan 96 is effective to draw off air at the port openings before it can enter the housing. There will also be, of course, $CO_2$ gas drawn into the exhaust due to the fact that the $CO_2$ gas fills the housing and seeks exits where it can.

If desired, the $CO_2$ gas may be recovered in a $CO_2$ recovery system attached to vent 98. Economic conditions dictate whether or not a recovery system is to be used. If no such system is used then the gas is vented to the atmosphere at a location which assures the safety of the freezer operators.

In practice, a control panel (not shown) is positioned external of the housing for conventional control of the temperature control and recording systems, valves, switching, etc., for regulating operation of the blowers, conveyor belt and cage drives, and exhaust fan.

A compact freezing unit such as described herein can have a freezing capacity of up to 6,000 lb./hr. and can be cooled from ambient temperature to its operating temperature in less than one hour due to the effective cooling action of the $CO_2$ spray nozzles, the line-flow fans, and minimal heat-leak of the unit. The heat-leak is in fact so low that it takes about 48 hours after shut-down for the unit to warm up to 0°F. Thus, during overnight and weekend shut-down, a setting of 0°F in the unit can be maintained with very small $CO_2$ consumption. As $CO_2$ is exceptionally clean and odorless, routine cleaning is infrequent and the resulting down time is minimal. Due to the high freezing capacity mentioned above the initial investment cost of the system unit is less than one-third that of a comparable capacity conventional system of the prior art.

The fast freezing system described above is, therefore, not only economical to operate but is also highly efficient in its use of cold $CO_2$ vapor in achieving optimum rate of heat transfer between the conveyed food and the inert freezing medium. As mentioned above, due to the very quick freezing, the delicate food cell structure is maintained and the natural flavors, juice and nutrients are "locked in" so that the thawed product is found to be almost identical to the fresh product in taste, texture and appearance.

The above described freezing system may be readily converted to accept liquid nitrogen as the consumable refrigerant. In certain localities where $CO_2$ is unavailable it may be more economical to use nitrogen or some other refrigerant gas. In such event the substitute refrigerant would be injected through nozzles such as 84 into the exhaust of the line-flow blowers in the manner described above.

Although the above described system is especially suited for freezing foods it may also be used for lowering the temperature of any desired article which is capable of passing through the housing on the conveyor system.

The embodiment of the invention illustrated in FIG. 1 shows a single helical flight of conveyors in the housing. It is also within the spirit and scope of this invention to position a pair of helical conveyors in a housing, in the manner taught in said U. S. Pat. No. 3,348,659, and utilize line-flow blowers in the manner taught above to cool product on the conveyors.

Having set forth the invention in what is considered to be the best embodiment thereof, it will be understood that changes may be made in the system and apparatus as above set forth without departing from the spirit of the invention or exceeding the scope thereof as defined in the following claims.

We claim:
1. A high-rate food freezing unit comprising:
   a. an insulating housing having an inlet port and an outlet port for passage through the unit of food to be frozen;
   b. a food conveyor having flights extending transversely of the housing and defining a continuous vertical helix centrally of the housing between upper and lower housing levels for carrying the food from the inlet to the outlet port;
   c. means for introducing low temperature gas into the housing to form a cold atmosphere for refrigerating the unit; and
   d. line-flow blower means having a substantially horizontal plane of rotation for circulating the cold atmosphere through the conveyor, the line-flow discharge of the blower means being in a direction generally tangential to said helix and across adjacent of said flights and said blower being of such length that said discharge spans at least a substantial number of the conveyor flights for directing the cold atmosphere across said flights.

2. 2, A freezing unit as specified in claim 1 wherein the blower means includes at least two similar blower units located respectively at spaced positions alongside the conveyor, each blower having a vertical axis of rotation for directing a line-flow stream between and across the flights of the conveyor.

3. A freezing unit as specified in claim 2 wherein the introducing means comprises $CO_2$ injecting means to direct $CO_2$ vapor into the discharge path of the blower means.

4. A freezing unit as specified in claim 3 wherein the conveyor constitutes an endless belt defining said vertical helix centrally of the housing, and the blower means direct respective line-flow streams through the peripheral part of the helix for creating swirling movement of the $CO_2$ atmosphere within the helix.

5. A freezing unit as specified in claim 4 wherein a third line-flow blower unit is similarly positioned alongside the periphery of the helix and spaced from the other two units and the line-flow stream from each of the units is directed in generally tangential relation to the helix for cumulative effect in creating the swirling movement of the $CO_2$ atmosphere.

6. A freezing unit as specified in claim 4 wherein the housing inlet port is opposite the lowest flight of the conveyor, and the conveyor moves the food therefrom in gradual ascent and in opposition to corresponding line-flow streams within a continuously swirling $CO_2$ atmosphere, to the outlet port opposite the upper flight of the conveyor.

7. A freezing unit as specified in claim 1 wherein a main exhaust duct extends across the housing and has branches extending respectively downward to the inlet and outlet ports for restricting entry of ambient air into the housing.

8. A freezing unit as specified in claim 3 wherein the $CO_2$ injecting means constitutes at least two expansion nozzles that are each located respectively generally above the discharge paths of the individual blower units for directing $CO_2$ vapor into the corresponding discharge path.

9. A freezing unit as specified in claim 4 wherein the blower units and conveyor are mounted centrally of the housing within an open supporting frame, the blower units being positioned in respective corners of the frame and oriented for cumulative swirling effect of the respective discharge streams about the helix and the corresponding blower driving motor is exteriorly mounted in vertical alignment on the top wall of the housing for ready servicing.

* * * * *